(12) United States Patent
Kobayashi

(10) Patent No.: US 11,631,538 B2
(45) Date of Patent: Apr. 18, 2023

(54) ELECTRONIC COMPONENT

(71) Applicant: Murata Manufacturing Co., Ltd., Nagaokakyo (JP)

(72) Inventor: Haruki Kobayashi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 17/367,731

(22) Filed: Jul. 6, 2021

(65) Prior Publication Data

US 2022/0013292 A1 Jan. 13, 2022

(30) Foreign Application Priority Data

Jul. 10, 2020 (JP) .............................. JP2020-119240

(51) Int. Cl.
| | |
|---|---|
| H01G 4/30 | (2006.01) |
| H01G 4/232 | (2006.01) |
| H01G 4/12 | (2006.01) |
| H01G 4/008 | (2006.01) |
| H01G 4/248 | (2006.01) |

(52) U.S. Cl.
CPC ......... *H01G 4/2325* (2013.01); *H01G 4/0085* (2013.01); *H01G 4/1227* (2013.01); *H01G 4/248* (2013.01); *H01G 4/30* (2013.01)

(58) Field of Classification Search
None
See application file for complete search history.

(56) References Cited

U.S. PATENT DOCUMENTS

| | | | | |
|---|---|---|---|---|
| 6,344,963 | B1* | 2/2002 | Mori .................... | H01G 4/232 |
| | | | | 361/306.3 |
| 10,971,302 | B2* | 4/2021 | Yanagisawa ......... | H01G 4/0085 |
| 2009/0046410 | A1* | 2/2009 | Takeoka ............... | H01G 4/1236 |
| | | | | 501/135 |
| 2010/0302704 | A1* | 12/2010 | Ogawa ................. | H01G 4/2325 |
| | | | | 361/306.3 |
| 2017/0018363 | A1* | 1/2017 | Tanaka ..................... | H01G 4/30 |
| 2019/0385794 | A1* | 12/2019 | Yanagisawa ......... | H01G 4/1245 |
| 2020/0020483 | A1* | 1/2020 | Tanaka ..................... | H01G 4/30 |
| 2020/0312565 | A1* | 10/2020 | Kanzaki ............... | H01G 4/2325 |
| 2021/0327648 | A1* | 10/2021 | Kanzaki ............... | H01G 4/2325 |

(Continued)

FOREIGN PATENT DOCUMENTS

| | | | | |
|---|---|---|---|---|
| CN | 114597068 A | * | 6/2022 | ............. H01G 2/065 |
| JP | 2000277371 A | * | 10/2000 | ............. H01G 4/232 |

(Continued)

*Primary Examiner* — Dion R. Ferguson

(74) *Attorney, Agent, or Firm* — Keating & Bennett, LLP

(57) ABSTRACT

A multilayer ceramic capacitor includes a multilayer body including dielectric layers and internal electrode layers laminated alternately on each other, and external electrode layers on both end surfaces of the multilayer body in a length direction orthogonal or substantially orthogonal to a lamination direction, and each connected to the internal electrode layers. The dielectric layers each include at least one of Ca, Zr, or Ti, the internal electrode layers each include Cu, and the external electrode layers each include a sintered electrode layer in which dielectric particles including at least one of Ca, Zr, or Ti are included in a metal including Ni, and at least one of a Cu-plated layer, a Ni-plated layer, and a Sn-plated layer on an outer side of the sintered electrode layer.

15 Claims, 10 Drawing Sheets

(56) References Cited

U.S. PATENT DOCUMENTS

| | | | |
|---|---|---|---|
| 2022/0013292 A1* | 1/2022 | Kobayashi | H01G 4/248 |
| 2022/0013297 A1* | 1/2022 | Kobayashi | H01G 4/0085 |
| 2022/0208451 A1* | 6/2022 | Cho | H05K 1/111 |

FOREIGN PATENT DOCUMENTS

| | | | | |
|---|---|---|---|---|
| JP | 2009-007209 A | | 1/2009 | |
| JP | 2019220678 A | * | 12/2019 | H01G 13/00 |
| KR | 20200041254 A | * | 4/2020 | |

\* cited by examiner

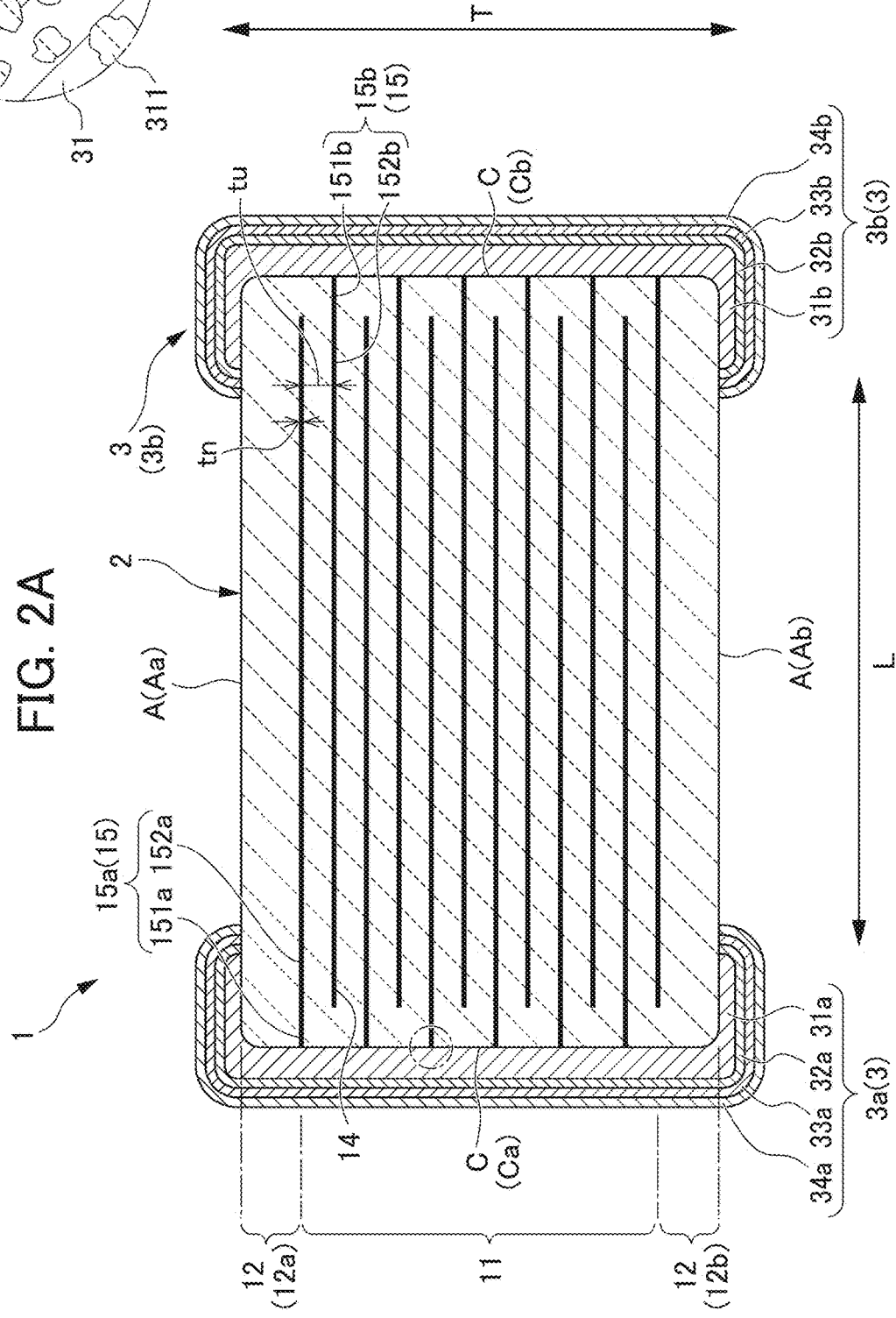
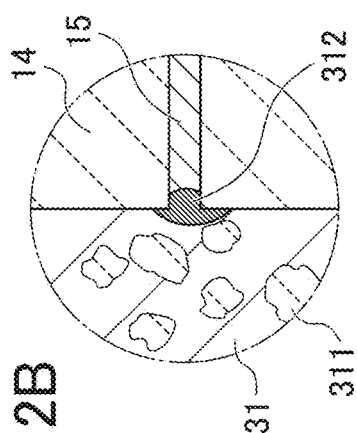
FIG. 2A
FIG. 2B

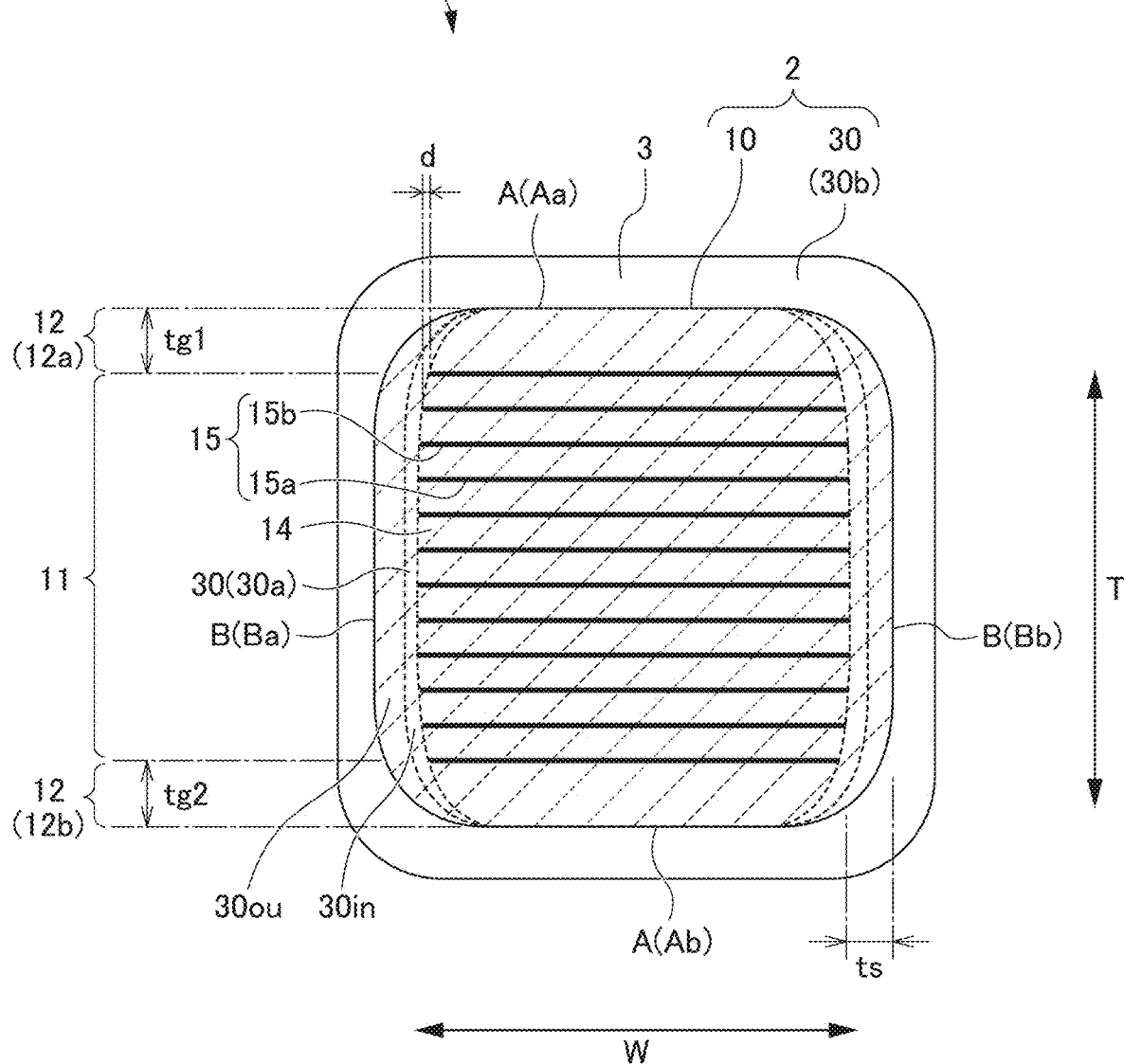

ELECTRONIC COMPONENT

CROSS REFERENCE TO RELATED APPLICATIONS

This application is based on and claims the benefit of priority from Japanese Patent Application No. 2020-119240, filed on Jul. 10, 2020, the entire contents of which are incorporated herein by reference.

BACKGROUND OF THE INVENTION

1. Field of the Invention

The present invention relates to an electronic component.

2. Description of the Related Art

Examples of an electronic component, such as a multilayer ceramic capacitor, include an electronic component having a high dielectric constant with a large capacitance and an electronic component for temperature compensation capacitance in which the rate of change in capacitance due to temperature is small. In such an electronic component for temperature compensation, dielectric layers including at least one of Ca, Zr, or Ti are generally used as a dielectric (refer to Japanese Unexamined Patent Application Publication No. 2009-7209). Furthermore, Cu is used in internal electrodes (refer to Japanese Unexamined Patent Application Publication No. 2009-7209), and Cu is used in external electrodes.

However, when the internal electrodes and the external electrodes include the same kind of metal, the bonding performance between the internal electrodes and the external electrodes during firing is deteriorated.

SUMMARY OF THE INVENTION

Preferred embodiments of the present invention provide electronic components each including a dielectric including at least one of Ca, Zr, or Ti, and having favorable bonding performance between internal electrodes and external electrodes.

A preferred embodiment of the present invention provides an electronic component that includes a multilayer body including dielectric layers and internal electrode layers laminated alternately on each other; and external electrode layers on both end surfaces of the multilayer body in a length direction orthogonal or substantially orthogonal to a lamination direction, and each connected to the internal electrode layers, wherein the dielectric layers each include at least one of Ca, Zr, or Ti, the internal electrode layers each include Cu, and the external electrode layers each include a sintered electrode layer in which dielectric particles including at least one of Ca, Zr, or Ti are included in a metal including Ni, and at least one of a Cu-plated layer, a Ni-plated layer, and a Sn-plated layer on an outer side of the sintered electrode layer.

According to preferred embodiments of the present invention, it is possible to provide electronic components each including a dielectric including at least one of Ca, Zr, or Ti, and having favorable bonding performance between internal electrodes and external electrodes.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 2A is a cross-sectional view of the multilayer ceramic capacitor 1 of FIG. 1 taken along the line II-II.

FIG. 2B is an enlarged view of a portion surrounded by a circle in FIG. 2A.

FIG. 3 is a cross-sectional view of the multilayer ceramic capacitor of FIG. 1 taken along the line III-III.

DETAILED DESCRIPTION OF THE PREFERRED EMBODIMENTS

In the following, a description will be provided of an exemplary multilayer ceramic capacitor 1 as an electronic component according to a preferred embodiment of the present invention. A multilayer ceramic capacitor 1 of the present preferred embodiment defines and functions as a capacitor for temperature compensation for use in the matching, etc., of the high-frequency circuit and the filter since the rate of change in capacitance due to temperature change is small.

Figure 1:
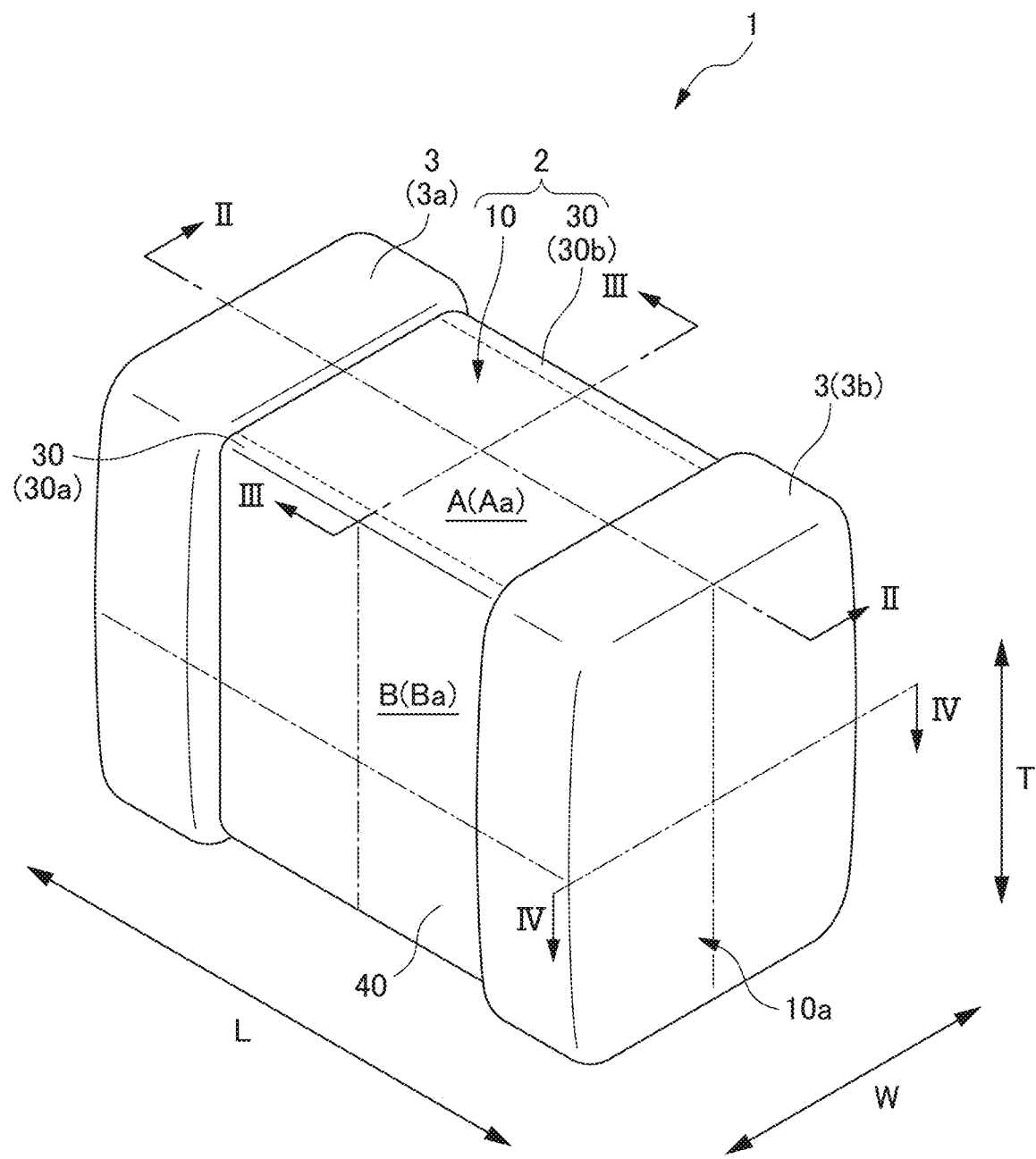
FIG. 1 is a schematic perspective view of a multilayer ceramic capacitor 1 according to a preferred embodiment of the present invention.
Figure 4:
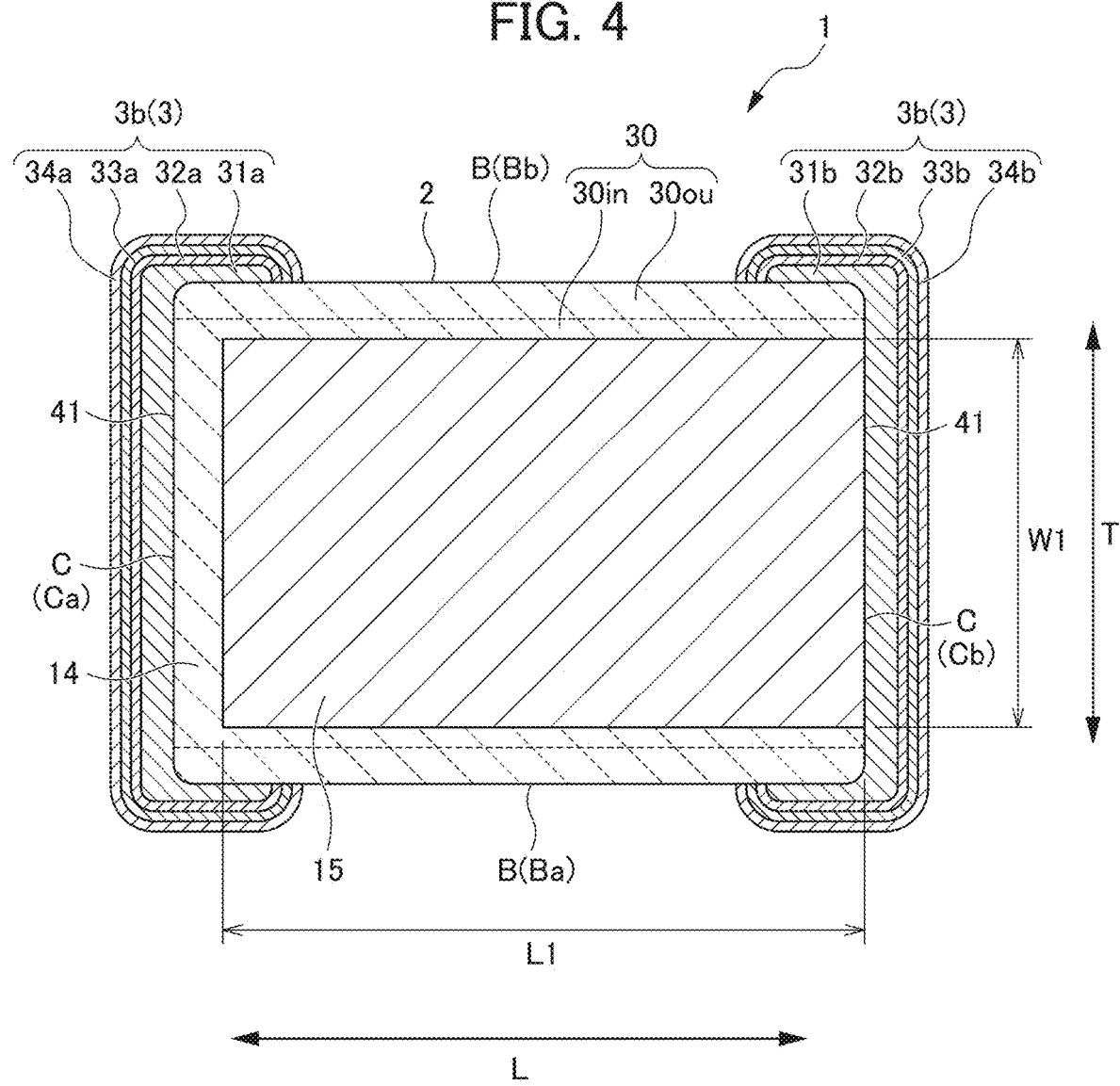
FIG. 4 is a cross-sectional view of the multilayer ceramic capacitor 1 of FIG. 1 taken along the line IV-IV.

FIG. 1 is a schematic perspective view of the multilayer ceramic capacitor 1. FIG. 2A is a cross-sectional view of the multilayer ceramic capacitor 1 of FIG. 1 taken along the line II-II, and FIG. 2B is an enlarged view of a portion surrounded by a circle of FIG. 2A. FIG. 3 is a cross-sectional view of the multilayer ceramic capacitor of FIG. 1 taken along the line III-III. FIG. 4 is a cross-sectional view of the multilayer ceramic capacitor 1 of FIG. 1 taken along the line IV-IV.

The multilayer ceramic capacitor 1 has a rectangular or substantially rectangular parallelepiped shape, and includes a multilayer body 2, and a pair of external electrode layers 3 provided on both ends of the multilayer body 2. Furthermore, the multilayer body 2 includes an inner layer portion 11 including a plurality of sets of the dielectric layers 14 and the internal electrode layers 15.

In the following description, as a term representing the orientation of the multilayer ceramic capacitor 1, the length direction L indicates the direction in which the pair of external electrode layers 3 are provided in the multilayer ceramic capacitor 1. The lamination (stacking) direction T indicates the direction in which the dielectric layers 14 and the internal electrode layers 15 are laminated (stacked). The width direction W indicates a direction intersecting both the length direction L and the lamination direction T. It should be noted that, in the present preferred embodiment, the width direction W, the length direction L, and the lamination direction T are orthogonal or substantially orthogonal to one another.

Figure 5:
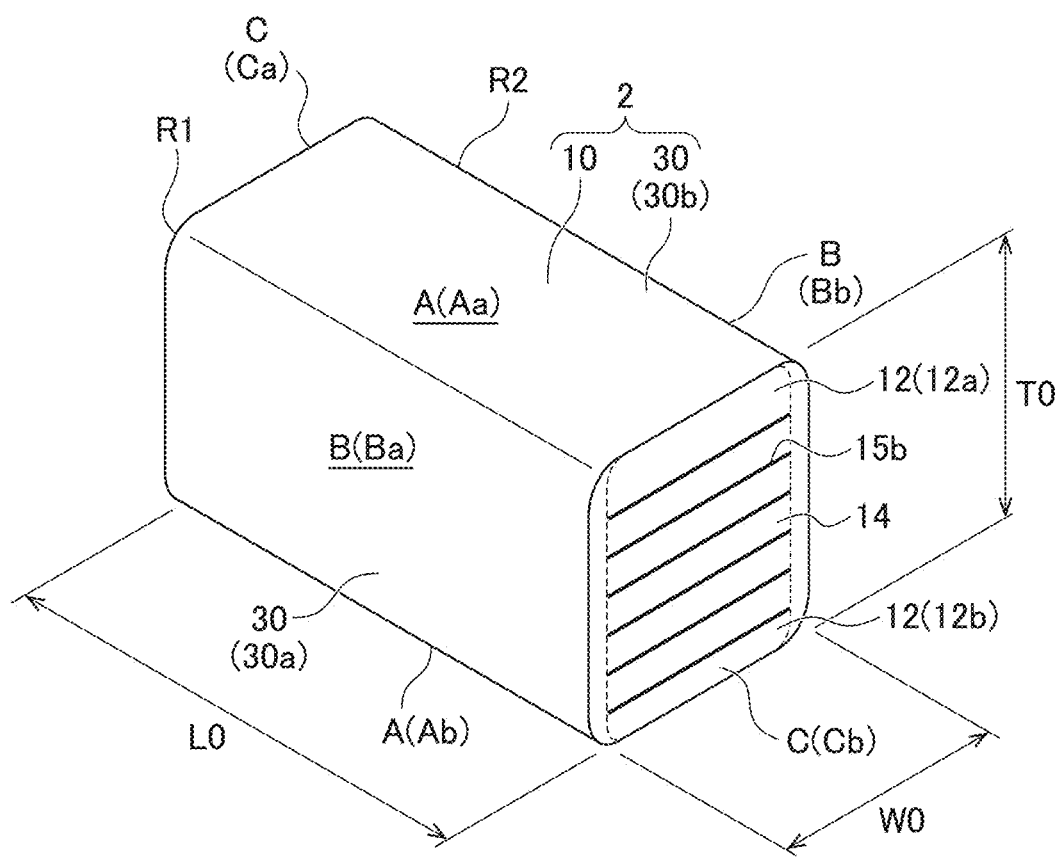
FIG. 5 is a schematic perspective view of a multilayer body according to a preferred embodiment of the present invention.
Figure 6:
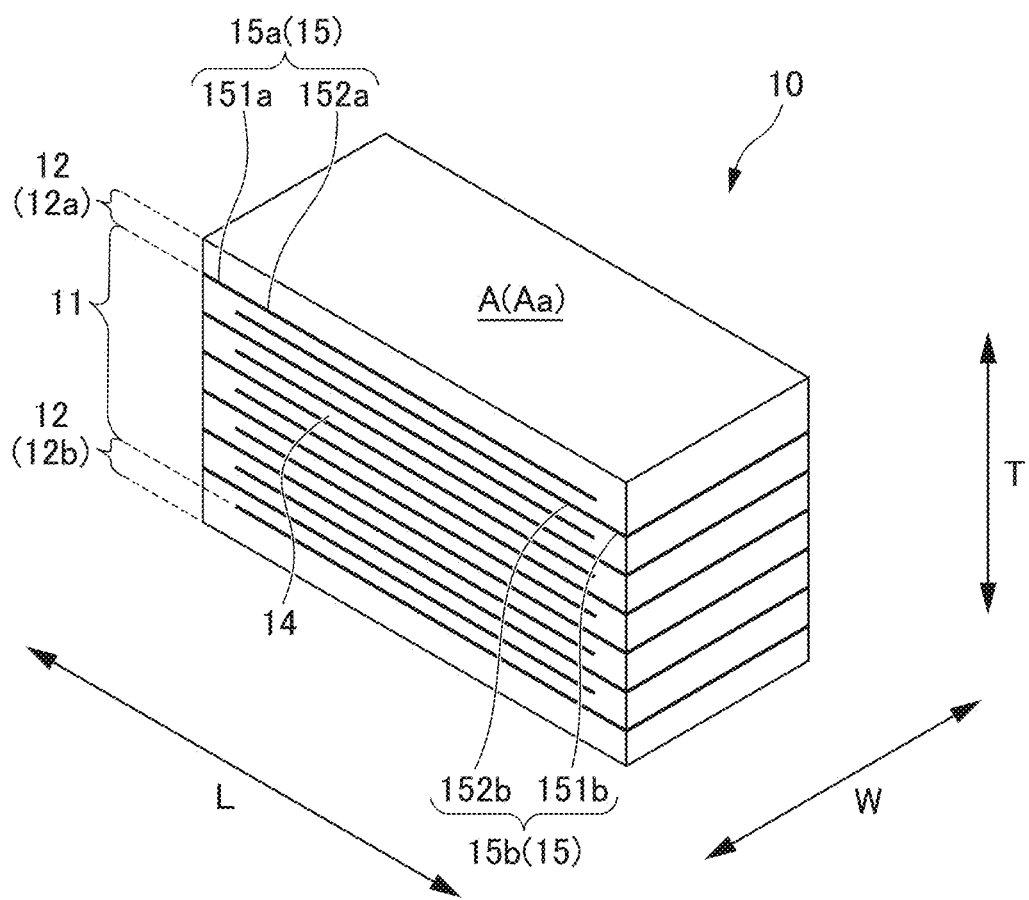
FIG. 6 is a schematic perspective view of a multilayer main body according to a preferred embodiment of the present invention in a state before side gap portions are formed.

FIG. 5 is a schematic perspective view of the multilayer body 2. The multilayer body 2 includes the multilayer main body 10 and side gap portions 30. FIG. 6 is a schematic perspective view of the multilayer main body 10 in a state before the side gap portions 30 are provided.

In the following description, among the six outer surfaces of the multilayer body 2 shown in FIG. 5, a pair of outer surfaces opposed in the lamination direction T are defined as a first main surface Aa and a second main surface Ab, a pair of outer surfaces opposed in the width direction W are defined as a first side surface Ba and a second side surface Bb, and a pair of outer surfaces opposed in the length direction L are defined as a first end surface Ca and a second end surface Cb. It should be noted that, when it is not necessary to particularly distinguish the first main surface Aa and the second main surface Ab from each other, they are collectively described as the main surface A, when it is not necessary to particularly distinguish the first side surface Ba and the second side surface Bb from each other, they are collectively described as the side surface B, and when it is not necessary to particularly distinguish the first end surface Ca and the second end surface Cb from each other, they are collectively described as the end surface C.

Multilayer Body 2

The multilayer body 2 includes a rounded corner portion R1 and a rounded ridge portion R2. The corner portion R1 is a portion where the main surface A, the side surface B, and the end surface C intersect. The ridge portion R2 is a portion where two surfaces of the multilayer body 2, i.e., the main surface A and the side surface B, the main surface A and the end surface C, or the side surface B and the end surface C, intersect. In addition, surface irregularities and the like may be provided on a portion or all of the main surface A, the side surface B, and the end surface C of the multilayer body 2.

As shown in FIG. 5, the dimension WO in the width direction of the multilayer body 2 is, for example, about 0.2 mm to about 2.0 mm, and preferably about 0.3 mm to about 1.5 mm. As shown in FIG. 5, the dimension TO in the lamination direction of the multilayer body 2 is, for example, about 0.25 mm to about 2.5 mm, and preferably about 0.4 mm to about 2.0 mm. As shown in FIG. 5, the dimension LO in the length direction of the multilayer body 2 is, for example, about 0.3 mm to about 3.0 mm, and preferably about 0.5 mm to about 5.5 mm. All dimensions shall include tolerances of about ±10%.

Multilayer Main Body 10

The multilayer main body 10 includes the inner layer portion 11, an upper outer layer portion 12a adjacent to the first main surface Aa of the inner layer portion 11, and a lower outer layer portion 12b adjacent to the second main surface Ab of the inner layer portion 11. It should be noted that, when it is not necessary to particularly distinguish between the upper outer layer portion 12a and the lower outer layer portion 12b, they are collectively described as the outer layer portion 12.

Inner Layer Portion 11

The inner layer portion 11 includes a plurality of sets of the dielectric layers 14 and the internal electrode layers 15 laminated alternately along the lamination direction T.

Dielectric Layer 14

The dielectric layer 14 includes at least one of Ca (calcium), Zr (zirconium), and Ti (titanium). As an example, the dielectric layer 14 includes a perovskite compound optionally including Ca, Zr, Sr, or Ti, and examples of the perovskite compound include $CaZrO_3$ (calcium zirconate), CaTiO (calcium titanate), $SrTiO_3$ (strontium titanate), $BaZrO_3$ (proton-conductive metallic oxide), and titanium oxide ($TiO_2$). In the multilayer ceramic capacitor 1, oxygen vacancies are often generated by firing in a reducing atmosphere. However, particularly in $CaZrO_3$, the generation of oxygen vacancies can be reduced or prevented because the band gap is large. As a result, high reliability can be obtained. In addition, Mn compounds, Fe compounds, Cr compounds, Co compounds, Ni compounds, and the like, for example, may be further added using these as main raw materials.

Since a material including at least one of Ca (calcium), Zr (zirconium), and Ti (titanium) is used for the dielectric layer 14 of the present preferred embodiment, the relative dielectric constant is about 20 to about 300, for example, and the capacitance is smaller compared to an electronic component having a high dielectric constant. Furthermore, the dielectric layer 14 of the present preferred embodiment has a characteristic in that the relative dielectric constant varies substantially linearly with respect to temperature, and therefore, it is excellent in heat resistance and high-frequency characteristics. Furthermore, in the dielectric layer 14 of the present preferred embodiment, the change over time of the capacitance value is negligibly small, the loss of the capacitor is small, and it has excellent stability even at high temperature, high power, and high frequency. In addition, in the dielectric layer 14, there is little change over time of the dielectric constant or due to voltage application.

The thickness tu of the dielectric layer 14 is preferably about 0.8 µm≤tu≤about 30.0 µm (about 0.40 µm or more and about 0.50 µm or less), and more preferably about 2.5 µm≤tu≤about 4.0 µm, for example. It should be noted that the number of dielectric layers 14 included in the multilayer main body 10 including the upper outer layer portion 12a and the lower outer layer portion 12b is preferably fifteen sheets or more and 700 sheets or less, for example.

Internal Electrode Layer 15

The internal electrode layers 15 include a plurality of first internal electrode layers 15a, and a plurality of second internal electrode layers 15b. The first internal electrode layers 15a and the second internal electrode layers 15b are provided alternately one by one. However, the present invention is not limited to the configuration in which one first internal electrode layer 15a and one second internal electrode layer 15b are provided alternately, and may be configured such that two first internal electrode layers 15a and two second internal electrode layers 15b are provided alternately, or may be configured such that two or more first internal electrode layers 15a and two or more second internal electrode layers 15b are provided alternately. Furthermore, preferred embodiments of the present invention may be configured such that different numbers of layers between the first internal electrode layers 15a and the second internal electrode layers 15b are provided alternately. In the following, when it is not necessary to distinguish the first internal electrode layer 15a from the second internal electrode layer 15b, they are collectively described as the internal electrode layer 15.

The internal electrode layer 15 mainly includes Cu. Since Cu is used for the internal electrode layer 15 in this way, for example, the resistance is small as compared with a case in which Ni is used. The thickness tn of the internal electrode layer 15 (the length in the lamination direction T) is preferably about 0.8 µm≤tn≤about 2.0 µm (about 0.25 µm or more and about 0.33 µm or less), for example. The number of the internal electrode layers 15 is preferably, for example, fifteen sheets or more and 700 sheets or less in total of the first internal electrode layers 15a and the second internal electrode layers 15b.

As shown in FIGS. 2 and 6, the first internal electrode layer 15a includes a first opposing portion 152a provided opposite to the second internal electrode layer 15b, and a first lead-out portion 151a extending from the first opposing portion 152a to the side of the first end surface Ca. An end of the first lead-out portion 151a is exposed at the first end surface Ca, and is electrically connected to a first external electrode layer 3a described later. The second internal electrode layer 15b includes a second opposing portion 152b provided opposite to the first internal electrode layer 15a, and a second lead-out portion 151b extending from the second opposing portion 152b to the second end surface Cb. An end of the second lead-out portion 151b is electrically connected to a second external electrode layer 3b described later. Charge is accumulated in the first opposing portion 152a of the first internal electrode layer 15a and the second opposing portion 152b of the second internal electrode layer 15b, such that the characteristics of the capacitor are provided.

As shown in FIG. 3, the deviation amount d in the width direction W between the positions of the ends of the first internal electrode layer 15a and the second internal electrode layer 15b vertically adjacent to each other in the lamination direction T is about 0.5 µm or less, for example. That is, the ends in the width direction W of the first internal electrode layer 15a and the second internal electrode layer 15b vertically adjacent to each other in the lamination direction T is at or substantially at the same position in the width direction W, and the positions of the ends are aligned or substantially aligned in the lamination direction T.

Outer Layer Portion 12

The outer layer portion 12 is made of a ceramic material including at least one of Ca, Zr, and Ti, and is the same or substantially the same material as the dielectric layer 14 of the inner layer portion 11.

In the present preferred embodiment, the upper outer layer portion 12a has the same or substantially the same length (thickness tg1) as the lower outer layer portion 12b in the lamination direction T, and is preferably, for example, about 10 µm≤tg1≤about 20 µm (about 10 µm or more and about 20 µm or less).

However, the present invention is not limited thereto, and the lower outer layer portion 12b, which is located on the side on which the substrate is mounted, may have a thickness which is thicker than a thickness of the upper outer layer portion 12a in the lamination direction T. In other words, the inner layer portion 11 including the internal electrode layers 15 may be biased toward the first main surface Aa in the lamination direction T. In the multilayer ceramic capacitor 1, electric power is supplied to the internal electrode layer 15, and an electric field is applied to the dielectric layer 14, a result of which there is a possibility that stress and mechanical strain are generated in the dielectric layer 14, which cause vibration. However, when the lower outer layer portion 12b is thicker than the upper outer layer portion 12a in the lamination direction T, the vibration is hardly transmitted to a substrate on which the multilayer ceramic capacitor 1 is mounted, and thus, the occurrence of "acoustic noise" is reduced or prevented.

Side Gap Portion 30

The side gap portions 30 cover the ends in the width direction W of the internal electrode layers 15 exposed on both side surfaces of the multilayer main body 10 along the ends thereof. The side gap portions 30 include a first side gap portion 30a provided on the first side surface Ba of the multilayer main body 10, and a second side gap portion 30b provided on the second side surface Bb of the multilayer main body 10. When it is not necessary to particularly distinguish the first side gap portion 30a and the second side gap portion 30b from each other, they are collectively described as the side gap portion 30.

The thickness ts of the side gap portion 30 is, for example, about 5 µm≤ts≤about 12 µm (about 5 µm or more and about 12 µm or less). The thickness depends on the size of the multilayer body 2. However, it may be, for example, about 250 µm at the maximum.

The side gap portions 30 are each made of a ceramic material including at least one of Ca, Zr, and Ti, and is the same or substantially the same material as the dielectric layer 14 of the inner layer portion 11, and the outer layer portion 12.

The side gap portions 30 each include a plurality of layers. When the inner layer thereof is defined as an inner layer 30in and the outer layer thereof is defined as the outer layer 30ou, the thicknesses are expressed as the inner layer 30in<the outer layer 30ou. However, the present invention is not limited thereto, and the side gap portion 30 may include a single layer. With a two-layer structure, since an interface is provided between the outer layer 30ou and the inner layer 30in, it is possible to reduce or prevent the stress acting on the multilayer ceramic capacitor 1 by this interface.

External Electrode Layer 3

The external electrode layer 3 includes a first external electrode layer 3a provided on a first end surface Ca of the multilayer body 2, and a second external electrode layer 3b provided on a second end surface Cb of the multilayer body 2.

The first external electrode layer 3a includes a first sintered electrode layer 31a, a first Cu-plated layer 32a provided on an outer side of the first sintered electrode layer 31a, a first Ni-plated layer 33a provided on an outer side of the first Cu-plated layer 32a, and a first Sn-plated layer 34a provided on an outer side of the first Ni-plated layer 33a. The first sintered electrode layer 31a includes a metal including Ni and dielectric particles 311 including at least one of Ca, Zr, and Ti, which are the same or substantially the same material as the dielectric layer 14 of the inner layer portion 11 and the outer layer portions 12.

The second external electrode layer 3b includes a second sintered electrode layer 31b, a second Cu-plated layer 32b provided on an outer side of the second sintered electrode layer 31b, a second Ni-plated layer 33b provided on an outer side of the second Cu-plated layer 32b, and a second Sn-plated layer 34b provided on an outer side of the second Ni-plated layer 33b. The second sintered electrode layer 31b includes a metal including Ni, and the dielectric particles 311 including at least one of Cb, Zr, and Ti, which are the same or substantially the same material as the dielectric layer 14 of the inner layer portion 11 and the outer layer portions 12.

When it is not necessary to distinguish the first external electrode layer 3a and the second external electrode layer 3b from each other, they are collectively described as the external electrode layer 3. The external electrode layer 3 covers not only the end surface C but also portions adjacent to the end surface C of the main surface A and the side surface B. When it is not necessary to particularly distinguish between the first sintered electrode layer 31a and the second sintered electrode layer 31b, they are collectively described as the sintered electrode layer 31. When it is not necessary to particularly distinguish between the first Cu-plated layer 32a and the second Cu-plated layer 32b, they are collectively described as the Cu-plated layer 32. When it is not necessary to particularly distinguish between the first Ni-plated layer 33a and the second Ni-plated layer 33b, they are collectively described as the Ni-plated layer 33. When it is not necessary to particularly distinguish between the first Sn-plated layer 34a and the second Sn-plated layer 34b, they are collectively described as the Sn-plated layer 34. Although an exemplary preferred embodiment describes a configuration including three layers of the Cu-plated layer 32, the Ni-plated layer 33, and the Sn-plated layer 34, the present invention is not limited to thereto. Preferred embodiments of the present invention may be configured to include any one, two, or four or more layers among the Cu-plated layer 32, the Ni-plated layer 33, and the Sn-plated layer 34, or may be configured not to include any plated layer.

The end of the first lead-out portion 151a of the first internal electrode layer 15a is exposed at the first end surface Ca, and is electrically connected to a sintered electrode layer 31 of the first external electrode layer 3a. The end of the second lead-out portion 151b of the second internal electrode layer 15b is exposed at the second end surface Cb, and is electrically connected to the sintered electrode layer 31 of the second external electrode layer 3b. Thus, a structure in which a plurality of capacitor elements are electrically connected in parallel is provided between the first external electrode layer 3a and the second external electrode layer 3b.

In the cross section LT extending in the lamination direction T and the length direction L, as shown in FIG. 2B, for example, the dielectric particles 311 in the sintered electrode layer 31 have the area ratio M of 35%≤M≤42%.

It should be noted that the cross section is not limited to the cross section LT shown in FIG. 2, and may be a cross section in any direction.

It should be noted that the dielectric particles 311 are uniformly or substantially uniformly dispersed within the sintered electrode layer 31. In other words, the entire or substantially the entire boundary portion between the internal electrode layer and the sintered electrode layer 31 is not covered by the dielectric particles 311. Therefore, at least partial contact between the internal electrode layer 15 and the metal containing Ni in the sintered electrode layer 31 is ensured. Therefore, the inner electrode layer, the sintered electrode layer 31, the Cu-plated layer 32, the Ni-plated layer 33, and the Sn-plated layer 34 are in conduction with each other.

Furthermore, as described later, the sintered electrode layer 31 and the internal electrode layer 15 are simultaneously sintered (cofired), and a Cu and Ni interdiffusion region of different metals is formed at the boundary portion between the sintered electrode layer 31 and the internal electrode layer 15 by the sintering (cofiring). As shown in FIG. 2B, an alloy layer 312 of Cu and Ni is provided in this interdiffusion region. This alloy layer 312 firmly bonds the sintered electrode layer 31 and the internal electrode layer 15.

Method of Manufacturing a Multilayer Ceramic Capacitor 1

Figure 7:
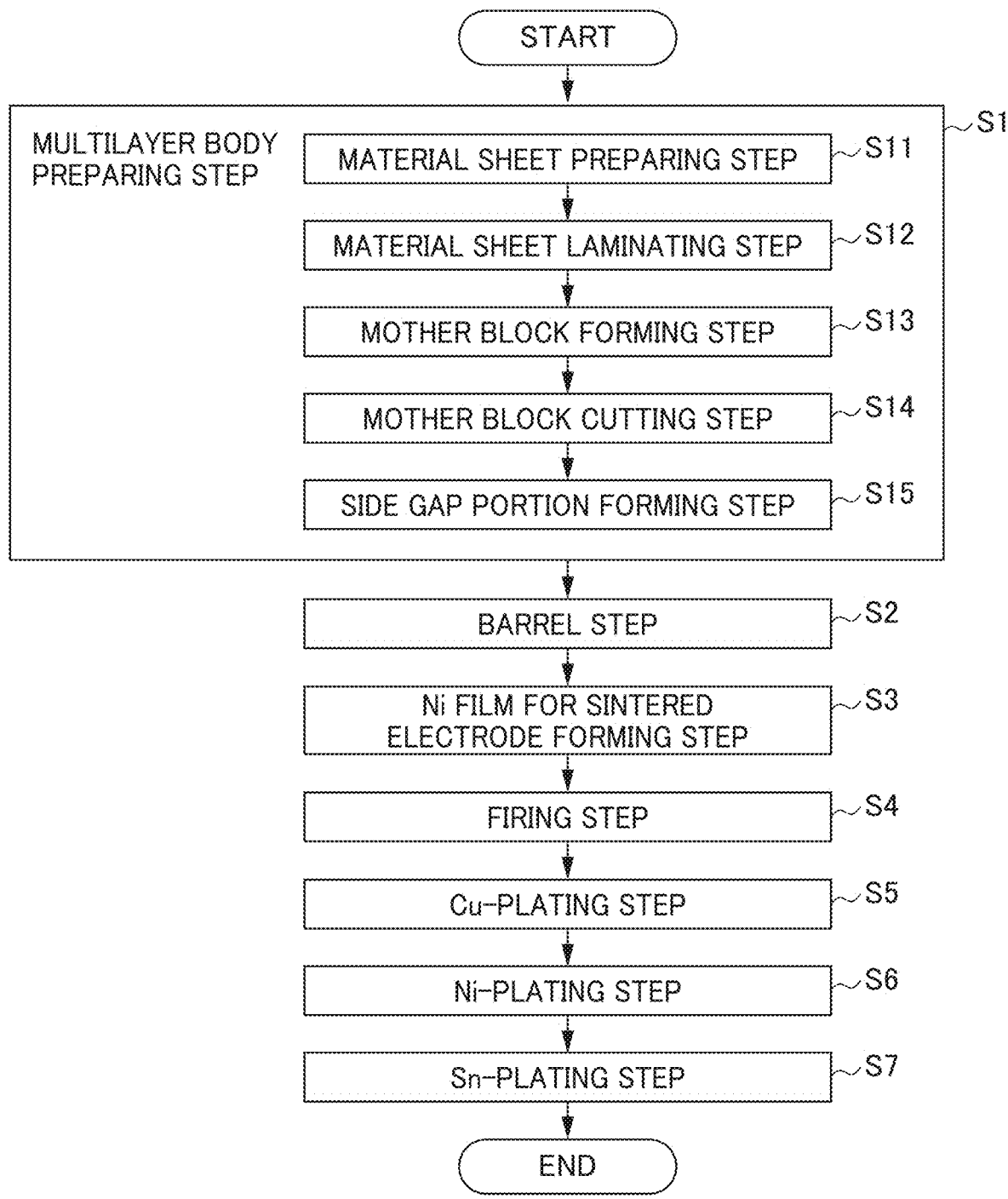
FIG. 7 is a flowchart for explaining a method of manufacturing a multilayer ceramic capacitor according to a preferred embodiment of the present invention.
Figure 8:
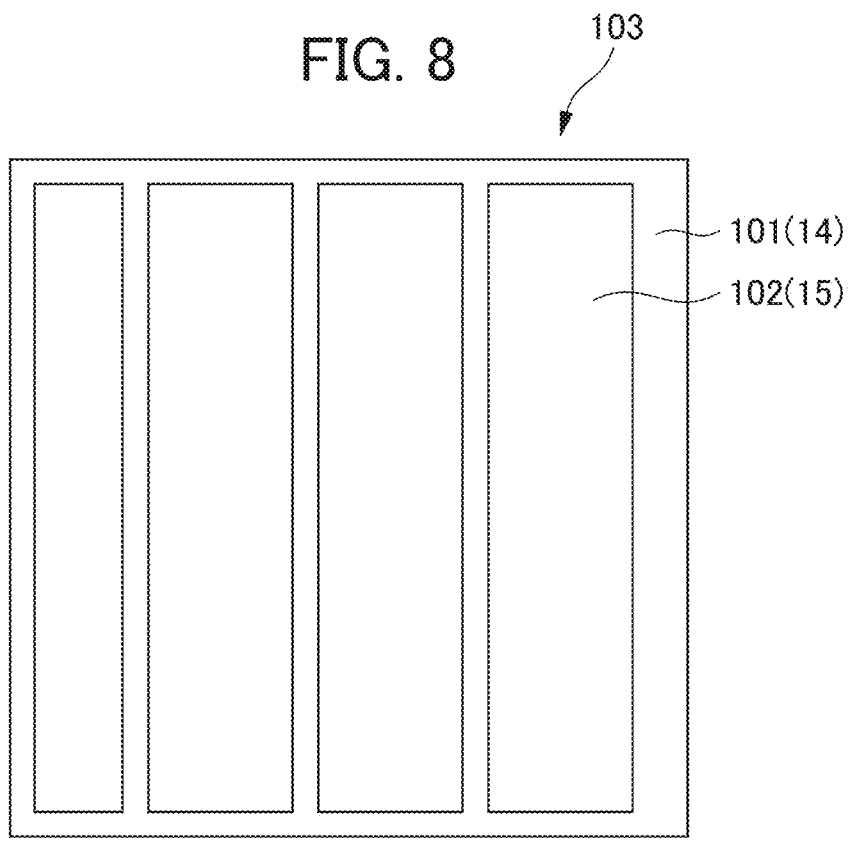
FIG. 8 is a diagram for explaining a multilayer body preparing step according to a preferred embodiment of the present invention.

FIG. 7 is a flowchart for explaining a method of manufacturing the multilayer ceramic capacitor 1 according to a preferred embodiment of the present invention. The method of manufacturing the multilayer ceramic capacitor 1 includes a multilayer body preparing step S1 of preparing the multilayer body 2. The multilayer body preparing step S1 further includes a material sheet preparing step S11, a material sheet laminating step S12, a mother block forming step S13, a mother block cutting step S14, and a side gap portion forming step S15. FIG. 8 is a diagram for explaining the multilayer body preparing step S1.

Material Sheet Preparing Step S11

In the material sheet preparing step S11, first, a powder including at least one of Ca, Zr, and Ti is prepared. Examples of such a powder include a perovskite compound optionally including Ca, Zr, Sr, or Ti, and examples of the perovskite compound include $CaZrO_3$ (calcium zirconate), CaTiO (calcium titanate), $SrTiO_3$ (strontium titanate), $BaZrO_3$ (proton-conductive metallic oxide), and titanium oxide ($TiO_2$).

The powder is weighed so as to provide a predetermined composition, and then wet-mixed using a ball mill or the like. The resulting mixture is dried and crushed. The powder obtained by crushing is calcined in the atmosphere, for example, at a temperature of about 900° C. or higher and about 1400° C. or less for about 2 hours. The calcined powder is crushed again, and a raw material powder of the main component is obtained.

Subsequently, as a raw material including sub components, for example, the respective powders of $SiO_2$ (silicone diode), $MnCO_3$ (manganese carbonate), and $Al_2O_3$ (aluminum oxide) are prepared. The raw material powder of the main component and the raw material powder of the sub component are weighed so that the raw material powder of the sub component has a predetermined blending ratio to the above-described raw material powder of the main component, following which wet mixing using a ball mill or the like is performed. Thereafter, the obtained mixture is dried and crushed to obtain a raw material powder.

Next, by adding, for example, polyvinyl butyral-based binder and an organic solvent, such as ethanol or toluene, to 100 parts by weight of the obtained raw material powder and wet mixing by a ball mill, a ceramic slurry is prepared. The ceramic slurry is molded using, for example, a die coater, a gravure coater, a microgravure coater, or the like on a carrier film, such that a multilayer ceramic green sheet 101 having a predetermined thickness (for example, about 5 µm to about 50 µm) is produced. Furthermore, an outer layer portion ceramic green sheet 112 defining and functioning as the outer layer portion 12 is also manufactured in the same or similar manner.

Subsequently, the conductive paste 102 defining and functioning as the internal electrode layer 15 and including Cu as a main component is printed to form a strip-shaped pattern by, for example, screen printing, ink jet printing, gravure printing, or the like on the multilayer ceramic green sheet 101.

Thus, as shown in FIG. 8, a material sheet 103 is prepared in which the conductive paste 102 defining and functioning as the internal electrode layer 15 is printed on the surface of the multilayer ceramic green sheet 101 defining and functioning as the dielectric layer 14.

Material Sheet Laminating Step S12

Figure 9:
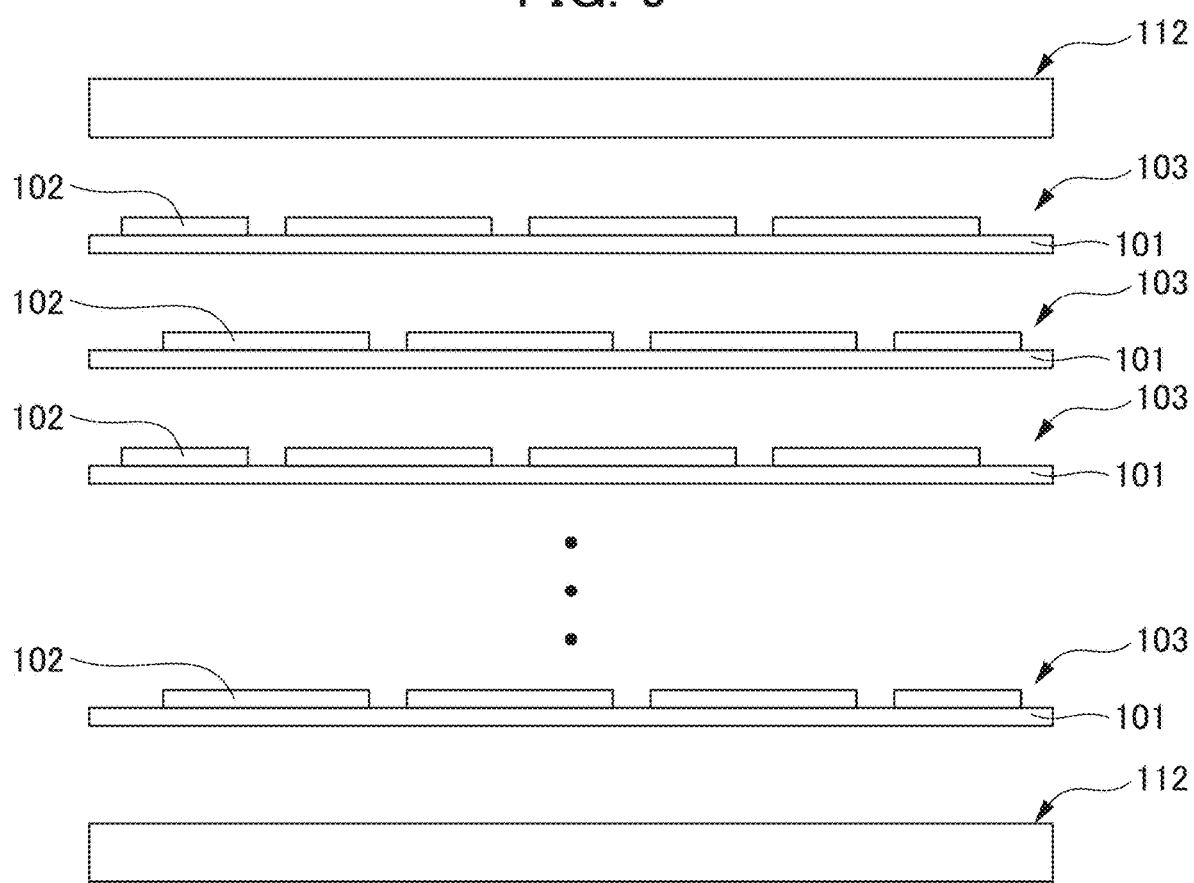
FIG. 9 shows a state in which a plurality of material sheets are laminated in a material sheet laminating step according to a preferred embodiment of the present invention.

Next, as shown in FIG. 9, a plurality of material sheets 103 are laminated in a material sheet laminating step S12. More specifically, the plurality of material sheets 103 are laminated such that strip-shaped conductive pastes 102 are directed in the same or substantially the same direction and are shifted by about a half pitch in the width direction between the adjacent material sheets 103. Furthermore, the outer layer portion ceramic green sheet 112 defining and functioning as the outer layer portion 12 is laminated on both sides of the plurality of laminated material sheets 103.

Mother Block Forming Step S13

Subsequently, in a mother block forming step S13, the upper outer layer portion ceramic green sheet 112, the plurality of laminated material sheets 103, and the lower outer layer portion ceramic green sheet 113 are subjected to thermocompression bonding. As a result, the mother block 110 shown in FIG. 10 is formed.

Mother Block Cutting Step S14

Figure 10:
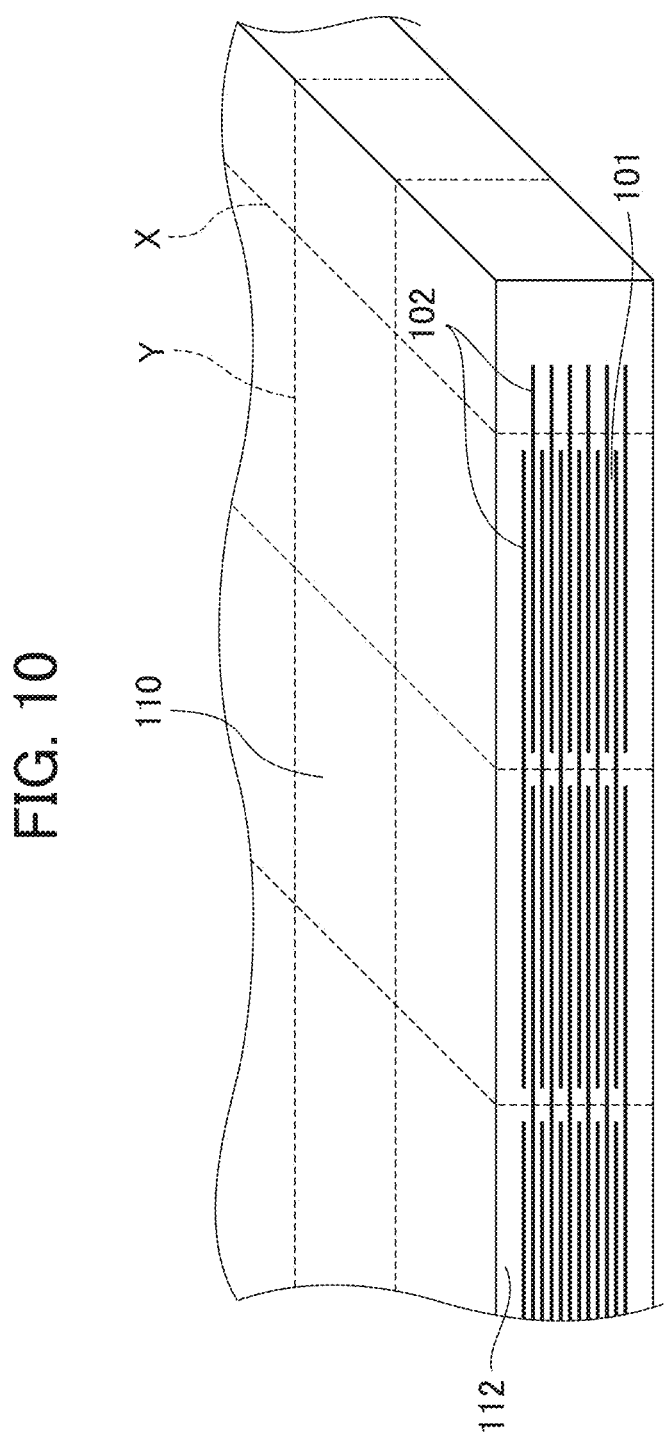
FIG. 10 shows a mother block according to a preferred embodiment of the present invention.

Then, in a mother block cutting step S14, the mother block 110 is cut along a cutting line X and a cutting line Y intersecting the cutting line X corresponding to the dimension of the multilayer main body 10 as shown in FIG. 10. As a result, the multilayer main body 10 shown in FIG. 6 is manufactured. It should be noted that the cutting line Y is orthogonal or substantially orthogonal to the cutting line X in the present preferred embodiment. At this time, the internal electrode layer 15 is exposed at the side portion of the multilayer main body 10.

Side Gap Portion Forming Step S15

Next, in a side gap portion forming step S15, a ceramic slurry is produced which includes at least one of Ca, Zr, and Ti which is the same as or similar to that of the multilayer ceramic green sheet 101. Then, the ceramic slurry is coated on a resin film, and dried to produce a side gap portion ceramic green sheet 114. The side gap portion ceramic green sheet 114 is manufactured for an inner layer 30*in* and for an outer layer 30*ou*.

The side surface LT where the internal electrode layer 15 of the multilayer main body 10 is exposed is first pressed against the side gap portion ceramic green sheet 114 for the inner layer 30*in*. Thus, the side gap portion ceramic green sheet 114 is crimped against the side surface LT of the multilayer main body 10, and the shearing force acts on the end of the side surface LT of the multilayer main body 10, such that the side gap portion ceramic green sheet 114 is punched. In this manner, one surface of the side surface LT of the multilayer main body 10 is covered with the side gap portion ceramic green sheet 114. Next, the other surface of the side surface LT of the multilayer main body 10 is also covered with the side gap portion ceramic green sheet 114 for the inner layer 30*in* in the same or similar manner.

Furthermore, the side gap portion ceramic green sheet 114 for the outer layer 30*ou* also covers both outer surfaces of the side gap portion ceramic green sheet 114 for the inner layer 30*in* on the side surface LT of the multilayer main body 10 in the same or similar manner. Thus, the multilayer body 2 in a state before sintering is formed in which the side gap portion 30 of the two layers of the inner layer 30*in* and the outer layer 30*ou* is adhered to the side surface LT of the multilayer main body 10.

Barrel Step S2

Next, in a barrel step S2, the multilayer body 2 is subjected to barrel polishing. As a result, as shown in FIG. 5, the corner portion R1 and the ridge portion R2 of the multilayer body 2 are rounded.

Ni Film for the Sintered Electrode Forming Step S3

In the Ni film for the sintered electrode forming step S3, the end surface C is immersed in the conductive paste including a metal including Ni and dielectric particles 311 including at least one of Ca, Zr and Ti. The amount of dielectric particles 311 included in the conductive paste is indicative of the amount of the dielectric particles 311 after sintering, which is the next step, have the area ratio of about 35%≤M≤about 42%, for example. With this ratio, the shrinkage amount of the multilayer body 2 during sintering and the amount of shrinkage of the sintered electrode layer 31 are equal or substantially equal, or the difference between the shrinkage amount of the multilayer body 2 and the amount of shrinkage of the sintered electrode layer 31 is small. In other words, this ratio is adjusted so as not to cause cracks or gaps between the sintered electrode layer 31 and the multilayer body 2 due to the shrinkage difference at the time of sintering.

Firing Step S4

In the firing step S4, firing is performed for a predetermined amount of time under a predetermined condition after the conductive paste including a metal including Ni and the dielectric particles 311 including at least one of Ca, Zr, and Ti is dried. That is, the sintered electrode layer 31 is sintered simultaneously (cofired) with the sintering of the multilayer body 2. A Cu and Ni interdiffusion region of different metals is formed at the boundary portion between the sintered electrode layer 31 and the internal electrode layer 15 by the sintering (cofiring). As shown in FIG. 2B, an alloy layer 312 of Cu and Ni is formed in the interdiffusion region. The alloy layer 312 firmly bonds the sintered electrode layer 31 and the internal electrode layer 15.

At this time, since the conductive paste forming the sintered electrode layer 31 includes the dielectric particles 311 having an amount of about 35%≤M≤about 42% after sintering, cracks or gaps do not occur between the sintered electrode layer 31 and the multilayer body 2 due to the shrinkage difference at the time of sintering.

Cu-Plating Step S5

Then, the Cu-plated layer 32 is formed on the outer periphery of the external electrode layer 3.

Ni-Plating Step S6

Then, the Ni-plated layer 33 is formed on the outer periphery of the Cu-plated layer 32.

Sn-Plating Step S7

Furthermore, the Sn-plated layer 34 is formed on the outer periphery of the Ni-plated layer 33.

With the above-described steps, the multilayer ceramic capacitor 1 of the present preferred embodiment is manufactured. Although a preferred embodiment of the present invention has been described above, the present invention is not limited to the preferred embodiments, and various modifications can be made within the scope of the present invention.

The multilayer ceramic capacitor 1 according to the present preferred embodiment includes a multilayer body 2 including dielectric layers 14 and internal electrode layers 15 laminated alternately on each other, and external electrode layers on both end surfaces of the multilayer body 2 in a length direction L orthogonal or substantially orthogonal to a lamination direction T, and each is connected to the internal electrode layers 15. Furthermore, the dielectric layers 14 each include at least one of Ca, Zr, or Ti, the internal electrode layers 15 each include Cu, and the external electrode layers 3 each include a sintered electrode layer 31 in which dielectric particles 311 including at least one of Ca, Zr, or Ti are included in a metal including Ni, and at least one of a Cu-plated layer 32, a Ni-plated layer 33, and a Sn-plated layer 34 on an outer side of the sintered electrode layer 31.

The sintered electrode layer 31 and the internal electrode layer 15 are simultaneously sintered (cofired), and a Cu and Ni interdiffusion region of different metals is provided at the boundary portion between the sintered electrode layer 31 and the internal electrode layer 15 by the sintering (cofiring). The alloy layer 312 of Cu and Ni is provided in the interdiffusion region. The alloy layer 312 firmly bonds the sintered electrode layer 31 and the internal electrode layer 15.

In a cross section extending in the lamination direction T and the length direction L, the dielectric particles 311 in the sintered electrode layer 31 have an area ratio M of about 35%≤M≤about 42%, for example. With this ratio, the shrinkage amount of the multilayer body 2 during sintering and the amount of shrinkage of the sintered electrode layer 31 are equal or substantially equal, or the difference between the shrinkage amount of the multilayer body 2 and the amount of shrinkage of the sintered electrode layer 31 is small. In other words, this ratio is adjusted so as not to cause cracks or gaps between the sintered electrode layer 31 and the multilayer body 2 due to the shrinkage difference at the time of sintering. Therefore, no cracks or gaps occur between the sintered electrode layer 31 and the multilayer body 2 due to the shrinkage difference during sintering.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic component comprising:
    a multilayer body including dielectric layers and internal electrode layers laminated alternately on each other; and
    external electrode layers on end surfaces of the multilayer body in a length direction orthogonal or substantially orthogonal to a lamination direction; wherein
    each of the external electrode layers is connected to the internal electrode layers;
    the dielectric layers each include at least one of Ca, Zr, or Ti;
    the internal electrode layers each include Cu;
    the external electrode layers each include:
        a sintered electrode layer in which dielectric particles including at least one of Ca, Zr, or Ti are included in a metal including Ni; and
        at least one of a Cu-plated layer, a Ni-plated layer, and a Sn-plated layer on an outer side of the sintered electrode layer; and
    in a cross section extending in the lamination direction and the length direction, the dielectric particles in the sintered electrode layer have an area ratio M of about 35% M about 42% and are dispersed within the sintered electrode layer.

2. The electronic component according to claim 1, further comprising an alloy layer including the Cu included in the internal electrode layers and the Ni included in the sintered electrode layer.

3. The electronic component according to claim 1, wherein
    a dimension of the multilayer body in a width direction orthogonal or substantially orthogonal to the lamination direction and the length direction is about 0.2 mm to about 2.0 mm;
    a dimension of the multilayer body in the lamination direction is about 0.25 mm to about 2.5 mm; and
    a dimension of the multilayer body in the length direction is about 0.3 mm to about 3.0 mm.

4. The electronic component according to claim 1, wherein the electronic component comprises a multilayer ceramic capacitor.

5. The electronic component according to claim 1, wherein
    the internal electrode layers include a plurality of first internal electrodes and a plurality of second internal electrodes alternately positioned in the lamination direction;
    at least one of the plurality of first internal electrodes is connected to a first external electrode layer of the external electrode layers; and
    at least one of the plurality of second internal electrodes is connected to a second external electrode layer of the external electrode layers.

6. The electronic component according to claim 1, wherein a laminated number of the internal electrode layers is fifteen or more and 700 or less.

7. The electronic component according to claim 1, wherein a thickness of each of the dielectric layers is about 0.40 µm or more and about 0.50 µm or less.

8. The electronic component according to claim 1, wherein a thickness of each of the internal electrode layers is about 0.25 µm or more and about 0.33 µm or less.

9. The electronic component according to claim 1, wherein side gap portions are provided on opposing surfaces of the multilayer body in a width direction orthogonal or substantially orthogonal to the lamination direction.

10. The electronic component according to claim 9, wherein each of the side gap portions includes a ceramic material including at least one of Ca, Zr, and Ti.

11. The electronic component according to claim 9, wherein each of the side gap portions includes a same material or substantially a same material as the dielectric layers.

12. The electronic component according to claim 9, wherein each of the side gap portions includes a plurality of layers.

13. The electronic component according to claim 12, wherein
    the plurality of layers of each of the side gap portions include an inner layer and an outer layer; and
    a thickness of the inner layer is less than a thickness of the outer layer.

14. The electronic component according to claim 13, wherein each of the side gap portions has a thickness of about 5 µm or more and about 12 µm or less.

15. The electronic component according to claim 1, wherein each of the dielectric layers includes a perovskite compound.

* * * * *